(12) United States Patent
Sarkar et al.

(10) Patent No.: US 7,968,079 B2
(45) Date of Patent: Jun. 28, 2011

(54) READY-TO-USE SEED COMPOSITION AND PROCESS THEREOF

(75) Inventors: Biswanath Sarkar, Haryana (IN); Kapil Arya, Haryana (IN); Gopal Ravichandran, Haryana (IN); Mohan Prabhu Kuvettu, Haryana (IN); Shiba Prasad Choudhury, Haryana (IN); Venkatachalam Krishnan, Haryana (IN); Sanjay Kumar Ray, Haryana (IN); Jayaraj Christopher, Haryana (IN); Satish Makhija, Haryana (IN)

(73) Assignee: Indian Oil Corporation Limited (IN)

( * ) Notice: Subject to any disclaimer, the term of this patent is extended or adjusted under 35 U.S.C. 154(b) by 664 days.

(21) Appl. No.: 11/970,780

(22) Filed: Jan. 8, 2008

(65) Prior Publication Data

US 2008/0182744 A1 Jul. 31, 2008

(30) Foreign Application Priority Data

Jan. 15, 2007 (IN) ................. 91/DEL/2007

(51) Int. Cl.
*C01B 39/20* (2006.01)
(52) U.S. Cl. ....................................... 423/709; 423/700
(58) Field of Classification Search .................. 423/709, 423/700
See application file for complete search history.

(56) References Cited

U.S. PATENT DOCUMENTS

| | | | |
|---|---|---|---|
| 3,306,922 A | 2/1967 | Barrer et al. | |
| 3,433,589 A | 3/1969 | Pitman et al. | |
| 3,574,538 A * | 4/1971 | McDaniel et al. | 423/709 |
| 3,789,107 A | 1/1974 | Elliott, Jr. | |
| 3,808,326 A * | 4/1974 | McDaniel et al. | 423/709 |
| 4,007,253 A | 2/1977 | Puppe et al. | |
| 4,016,246 A | 4/1977 | Whittam | |
| 4,166,099 A | 8/1979 | McDaniel et al. | |
| 4,175,059 A | 11/1979 | Edwards et al. | |
| 4,228,137 A | 10/1980 | Taylor et al. | |
| 4,340,573 A | 7/1982 | Vaughan et al. | |
| 4,376,106 A | 3/1983 | Miyanohara et al. | |
| 4,406,822 A * | 9/1983 | Sanders et al. | 502/67 |
| 4,608,236 A | 8/1986 | Strack et al. | |
| 4,631,262 A | 12/1986 | Altomare | |
| 4,931,267 A | 6/1990 | Vaughan et al. | |
| 5,154,904 A | 10/1992 | Kleinschmit et al. | |
| 6,284,218 B1 | 9/2001 | Kuvettu et al. | |

OTHER PUBLICATIONS

Scherzer, Julius, "Octane-Enhancing Zeolitic FCC Catalysts", Marcel Dekker, Inc., 1990, pp. 24-25.
"Zeolite Molecular Sieves", John Wiley and Sons, D. W. Breck, 1974, pp. 278-279.

* cited by examiner

*Primary Examiner* — David M Brunsman
(74) *Attorney, Agent, or Firm* — Lowe Hauptman Ham & Berner, LLP

(57) ABSTRACT

The present disclosure provides a ready-to-use seed composition water, a source of silica, a source of alumina, and $Na_2O$, wherein the molar ratio of $H_2O:Na_2O$ ranges from 5 to 20, $Na_2O:SiO_2$ ranges from 0.4 to 5 and $SiO_2:Al_2O_3$ ranges from 1.3 to 5 used in the preparation of a synthetic faujasite zeolite which has high thermal stability and higher crystallite size. It further provides a process for preparing the ready-to-use seed composition for preparation of synthetic faujasite zeolite that requires lower crystallization time. The present disclosure provides a seed composition that does not require maturing time and a reaction gel composition that has low water and soda content. The present disclosure further provides a process for the preparation of synthetic faujasite zeolite by blending seed and reaction gel reaction composition to form a seed gel composition and subjecting it to crystallization.

13 Claims, No Drawings

READY-TO-USE SEED COMPOSITION AND PROCESS THEREOF

CROSS-REFERENCE TO RELATED APPLICATION(S)

This application claims priority from Indian Application No. 91/DEL/2007 filed on Jan. 15, 2007, the disclosure of which is incorporated herein by reference in its entirety.

TECHNICAL FIELD

The present invention relates to a ready-to-use seed composition used in the preparation of thermally stable, high crystallite size faujasite type zeolite. The invention further relates to a process of producing a ready-to-use seed composition having zero maturation time that is used in the process of preparation of thermally stable, high crystallite size faujasite type zeolite.

BACKGROUND

Crystalline sodium aluminosilicate materials, which are able to distinguish molecules of slightly differing size and thus able to separate them from a mixture of gases are known as "molecular sieves" and quite often referred as "zeolites". In particular, crystalline material to be named as a "zeolite," needs to have at least one aluminum atom per unit cell, to offer catalytic activity. A number of synthetic crystalline zeolites have been prepared in the past for applications as catalysts for fluid catalytic cracking (FCC) and related operations. The most prominent and much exploited among them till date is zeolite Y. This type of zeolite with different derivatives such as NH4Y, REY, USY has been extensively used in FCC catalyst formulations.

Y zeolite is a synthetic analog of naturally occurring zeolite named faujasite, with respect to structure. The detailed synthesis of Y zeolite from sodium aluminosilicate gels with and without aging having molar composition ratios of $H_2O/Na_2O$:40, $Na_2O/SiO_2$:0.3-0.4, $SiO_2/Al_2O_3$:8-20 has been discussed in Zeolite Molecular Sieves, John Wiley and Sons, D. W. Breck, 1974, pages 278 to 79. Further, the referred literature also mentions crystallization of zeolite Y associated with impurities such as A, X and P type of zeolites. Due to presence of impurities and unreasonably long crystallization time (50 to 144 hours), synthesis of Y type zeolite from above mentioned composition is not popular.

Original synthesis procedures for Y type zeolite involves prolonged aging period followed by additional period for crystallization. In general, zeolites X and Y can be synthesized from a reaction mixture comprising soda, alumina and silica in aqueous media under alkaline conditions with crystallization time ranging from 50 to 144 hours. Aging of reaction mixture can reduce crystallization time to some extent. Precursor gel once prepared and heated to crystallization temperature, zeolite growth does not start instantaneously; rather it takes some time known as "induction period" that is defined as time required for providing the conditions for "nuclei" formation. However, if analogous hydrated structure or seed is introduced to the precursor gel mixture, crystal growth occurs instantaneously over the seeds, bringing induction period to zero. Seeding not only nullify the induction period, it is an elegant technique for growing pure samples of any structure with control over crystal size at a much lower crystallization time.

Seeds of zeolite X act as ideal structures for the growth of Y as both have similar structure, the only difference being silica to alumina ratio. Nuclei of zeolite X can be easily prepared at room temperature and on transferring it to a gel mixture with appropriate composition, nuclei of X zeolite, starts growing with higher silica to alumina ratio, thus producing faujasite type zeolite. In all the prior art processes and compositions, seed preparation technique is time consuming with maturing time varying from few hours to 24 hours. Crystallization can also be initiated by the application of organic molecules having appropriate size and geometry as templates.

U.S. Pat. No. 3,306,922 refers to synthesis of Y zeolite (Na—Y) employing quaternary ammonium ions such as tetramethylammonium at 100° C. in 13 days. Such a process is economically not viable due to long crystallization period and additional cost involved due to template.

U.S. Pat. No. 3,433,589 refers to the synthesis of Y zeolite employing seed having molar composition, $1.45Na_2O$: $1Al_2O_3$:$16.3SiO_2$:$5.4Na_2SO_4$:$550H_2O$ with maturing time of 24 hours at 23° C.

U.S. Pat. No. 3,789,107 refers to a seeding material having composition, in the range $5$-$15Na_2O$:$3$-$10Na_2SO_4$:$1$-$4.0Al_2O_3$:$5$-$50SiO_2$:$50$-$500H_2O$, for Y zeolite synthesis with aging for 24 hours at room temperature for maturity.

U.S. Pat. No. 4,016,246 refers to a process for preparing faujasite zeolite employing colloidal silica as a silica source.

U.S. Pat. No. 4,166,099 describe processes for the synthesis of faujasite type zeolite employing seed having composition, $16Na_2O$:$1Al_2O_3$:$15SiO_2$:$400$-$2000H_2O$ with aging time between 2 to 16 hours at room temperature.

U.S. Pat. No. 4,175,059 elaborates a process for preparing a synthetic faujasite having a novel platelet-type crystalline shape with silica to alumina ratio above 2.2 by adding potassium ions to seeded faujasite synthesis slurry and heating to convert to the synthetic faujasite. The said zeolite is crystallized employing seed mixture, aged to 16 hours having molar composition, $12$-$20Na_2O$:$0.75$-$5Al_2O_3$:$14$-$19SiO_2$:$100$-$600H_2O$.

U.S. Pat. No. 4,228,137 relates to a process for an improvement in the production of zeolites, particularly of the faujasite type, employing clay based seeds derived from natural halloysite.

U.S. Pat. No. 4,340,573 relates to a seed composition of the molar ratio, $16Na_2O$:$2$-$9Al_2O_3$:$15SiO_2$:$500$-$2000H_2O$. In the said invention, the seed is aged between 15 minutes to 96 hours at temperature between 20-80° C.

U.S. Pat. No. 4,376,106 describes a process for producing Y-type zeolite with $SiO_2/Al_2O_3$ molar ratio of at least 4 by employing washed gel of molar composition, $0.993Na_2O$: $1Al_2O_3$:$3SiO_2$:$78H_2O$ as promoter. Preparation of this type of promoter for Y-zeolite is labor intensive and time consuming as the gel and reaction mixtures were required to be heated to 95° C. for 48 hours for obtaining Y-zeolite.

U.S. Pat. No. 4,406,822 relates to a process for simultaneous production of combined X and A zeolite promoted by powdered seed of zeolite X.

U.S. Pat. No. 4,608,236 refers to the process for production of mature seed mixture of molar composition $9$-$15Na_2O$: $1Al_2O_3$:$12$-$18SiO_2$:$180$-$300H_2O$ that is obtained after aging for minimum of 24 hours.

U.S. Pat. No. 4,631,262 refers to a process for enhancing of storage life of a clear solution of seeds having molar ratios in the range $H_2O/Na_2O$, $15$-$18$:$Na_2O/SiO_2$, $0$-$9$-$1.1$; $SiO_2/Al_2O_3$, $5.5$-$19$; by addition of sodium silicate. The seed has been used for promoting crystallization of Y zeolite in porous microspheres of calcined clay.

U.S. Pat. No. 4,931,267 refers to the synthesis of faujasite like structure having silica to alumina ratio greater than 6, employing tetrapropyl ammonium and/or tetrabutyl ammonium and seed with the composition, $13.3Na_2O:1Al_2O_3:12.5SiO_2:267H_2O$.

U.S. Pat. No. 5,154,904 refers to a process for the preparation of synthetic faujasite employing seed having composition, $9\text{-}15Na_2O:1Al_2O_3:9\text{-}15SiO_2:140\text{-}260H_2O$; aged for the duration of 18-72 hours between 30-70° C.

U.S. Pat. No. 6,284,218 refers to a process for the preparation of high crystallite size, faujasite type zeolite by employing a seeding mixture of molar composition, $14.9Na_2O:1Al_2O_3:14.38SiO_2:319H_2O$ where the maturation time of about 23 hours is employed.

Further, the highest crystallite size reported therein is 1700 Å. A direct correlation between crystallite size and thermal stability of NaY zeolite has been established.

The relation between thermal stability and silica to alumina ratio of zeolite framework has been extensively discussed by Julius Scherzer ("Octane-Enhancing Zeolite FCC Catalysts", Marcel Dekker, 1990). The author has reported that thermal stability of zeolite increases with increase in silica to alumina ratio in zeolite framework. Various techniques such as thermal and hydrothermal treatment, chemical modification with EDTA and ammonium hexafluorosilicate have been described for the enhancement of silica to alumina ratio of Y zeolite framework. However, these techniques are hardware intensive and involve usage of hazardous chemicals.

From the prior art processes, it can be seen that faujasite type zeolite can be easily synthesized employing a mature seeding material having composition to that of zeolite X or zeolite Y. These compositions on subjecting to crystallization lead to the production of zeolite X or zeolite Y. However, application of mature seeds in the range 1 to 20 wt % on Y precursor gel and subjecting the mixture to a temperature of crystallization leads to the production of Y zeolite.

Zeolite A, another synthetic zeolite with framework silica to alumina ratio 2 has similar secondary building unit "sodalite" cage (14 hedron, polyhedra) in its structure as compared to that of Y zeolite. The only difference is in the sharing of face, in Y zeolite, 6-ring face is shared between sodalite cages, while in zeolite A, 4-ring face is shared between sodalite cages.

It can be inferred from the various patent and non-patent literature that the synthesis of zeolite X and Y can be carried out easily over seeds of zeolite X with silica to alumina ratio of composition centered around 3.5 to 20, that can be easily prepared at ambient temperature 25-35° C.

Till date there is no attempt to produce Y zeolite employing X-ray amorphous promoter having composition as that of zeolite A. The only exception is U.S. Pat. No. 4,007,253 that discloses the process for the production of faujasite promoted by finely divided zeolite A that is in the form of crystallized powder with particle radius less than 1 micron.

Thus, the present invention overcomes the long maturation time of the seed compositions of the prior arts and discloses a ready-to-use seed composition. The ready-to-use seed composition having zero maturation time is used in the preparation of a synthetic faujasite zeolite having high thermal stability and high crystallinity.

SUMMARY OF THE INVENTION

The present disclosure provides a ready-to-use seed composition and process of its preparation.

Further, present disclosure provides a process of preparing ready-to-use seed composition that is used in the preparation of faujasite type zeolite with high thermal stability and high crystallinity.

Further, present disclosure provides a seed and reaction gel composition, application of which results in faujasite zeolite with improved physical properties such as thermal stability owing to higher crystallite size.

More precisely, present disclosure provides a process for the preparation of seed composition with low silica to alumina ratio, which can be instantly adopted for promoting production of faujasite type zeolite.

DETAILED DESCRIPTION OF THE INVENTION

An embodiment of the present disclosure provides a ready-to-use seed composition for preparing a synthetic faujasite zeolite having enhanced thermal stability and high crystallinity, said composition comprising
 a) water ($H_2O$),
 b) a source of silica ($SiO_2$),
 c) a source of alumina ($Al_2O_3$), and
 d) $Na_2O$,
wherein molar ratio of $H_2O:Na_2O$ ranges from 5 to 100, $Na_2O:SiO_2$ ranges from 0.4 to 5.0, and $SiO_2:Al_2O_3$ ranges from 1.3 to 5.

Another embodiment of the present disclosure provides a ready-to-use seed composition for preparing a synthetic faujasite zeolite having enhanced thermal stability and high crystallinity, said composition comprising
 a) water ($H_2O$),
 b) a source of silica ($SiO_2$),
 c) a source of alumina ($Al_2O_3$), and
 d) $Na_2O$,
wherein molar ratio of $H_2O:Na_2O$ ranges from 10 to 40, $Na_2O:SiO_2$ ranges from 1 to 2.5, and $SiO_2:Al_2O_3$ ranges from 1.5 to 5.

An embodiment of the present disclosure relates to a ready-to-use seed composition wherein the source of silica is selected from a group consisting of alkaline sodium silicate, neutral sodium silicate, colloidal silica, silica gel, and precipitated silica.

Another embodiment of the present disclosure relates to a ready-to-use seed composition, wherein the source of aluminum is selected from a group consisting of aluminum sulfate, sodium aluminate, aluminum acetate, aluminum formate, bayrite, pseudoboehmite, alumina gel and alumina sol.

An embodiment of the present disclosure provides a process for producing ready-to-use seed composition, said process comprising blending water ($H_2O$), a source of silica ($SiO_2$), a source of alumina ($Al_2O_3$) and $Na_2O$, said seed composition having a molar ratio of $H_2O:Na_2O$ ranging from 5 to 100, $Na_2O:SiO_2$ ranging from 0.4 to 5.0, and $SiO_2:Al_2O_3$ ranging from 1.3 to 5.

Another embodiment of the present disclosure provides a process for producing ready-to-use seed composition, said process comprising blending water ($H_2O$), a source of silica ($SiO_2$), a source of alumina ($Al_2O_3$) and $Na_2O$, said seed composition having a molar ratio of $H_2O:Na_2O$ ranging from 10 to 40, $Na_2O:SiO_2$ ranging from 1 to 2.5, and $SiO_2:Al_2O_3$ ranging from 1.5 to 5.

Yet another embodiment of the present disclosure provides a process for preparing ready-to-use seed composition that requires dissolving the source of silica ($SiO_2$) in water and heating it to a temperature ranging from 20 to 80° C.

Still another embodiment of the present disclosure provides a process for preparing ready-to-use seed composition that requires heating the source of alumina ($Al_2O_3$) to the temperature ranging from 30 to 100° C.

An embodiment of the present disclosure provides a process for preparing a synthetic faujasite zeolite with enhanced thermal stability and higher crystallite size, said process comprising;
- a) blending water ($H_2O$), a source of silica ($SiO_2$), a source of alumina ($Al_2O_3$) and $Na_2O$ to obtain a seed composition having molar ratio of $H_2O:Na_2O$ ranging from 5 to 100, $Na_2O:SiO_2$ ranging from 0.4 to 5.0 and $SiO_2:Al_2O_3$ ranging from 1.3 to 5, wherein the seed composition requires no maturation time;
- b) blending water ($H_2O$), a source of silica ($SiO_2$), a source of alumina ($Al_2O_3$) and $Na_2O$ to obtain a reaction gel composition having molar ratio of $H_2O:Na_2O$ ranging from 8 to 1000, $Na_2O:SiO_2$ ranging from 0.1 to 2.0 and $SiO_2:Al_2O_3$ ranging from 5 to 20;
- c) homogeneously blending seed composition with reaction gel composition to form a seed-reaction gel composition; and
- d) heating the seed-reaction gel composition to a temperature ranging from 95 to 105° C. for a time period ranging from 18 to 30 hours to obtain the synthetic faujasite zeolite, wherein the synthetic faujasite zeolite having crystallite size ranging from 1950 to 2200 Å.

Another embodiment of the present disclosure provides a process for preparing a synthetic faujasite zeolite with enhanced thermal stability and higher crystallite size, said process comprising;
- a) blending water ($H_2O$), a source of silica ($SiO_2$), a source of alumina ($Al_2O_3$) and $Na_2O$ to obtain a seed composition, having molar ratio of $H_2O:Na_2O$ ranging from 10 to 40, $Na_2O:SiO_2$ ranging from 1 to 2.5 and $SiO_2:Al_2O_3$ ranging from 1.5 to 5, wherein the seed composition requires no maturation time;
- b) blending water ($H_2O$), a source of silica ($SiO_2$), a source of alumina ($Al_2O_3$) and $Na_2O$ to obtain a reaction gel composition having molar ratio of $H_2O:Na_2O$ ranging from 18 to 45, $Na_2O:SiO_2$ ranging from 0.4 to 0.9 and $SiO_2:Al_2O_3$ ranging from 7 to 20;
- c) homogeneously blending seed composition with reaction gel composition to form a seed-reaction gel composition; and
- d) heating the seed-reaction gel composition to a temperature ranging from 95 to 105° C. for a time period ranging from 18 to 30 hours to obtain the synthetic faujasite zeolite, wherein the synthetic faujasite zeolite having crystallite size ranging from 1950 to 2200 Å.

An embodiment of the present disclosure provides a process for preparing a synthetic faujasite zeolite with enhanced thermal stability and higher crystallite size, the ratio of the seed composition and the reaction gel composition ranges from 0.5 to 20:99.5 to 80 w/w.

Another embodiment of the present disclosure provides a process for preparing a synthetic faujasite zeolite having thermal stability to a temperature of 950° C.

Another embodiment of the present disclosure provides a process for preparing a synthetic faujasite zeolite with enhanced thermal stability and crystallinity ranging from 95 to 98%.

An embodiment of the present disclosure relates to the application of ready-to-use seed composition to another gel mixture and further heating to a temperature 95 to 105° C. resulting seed-reaction gel mixture to obtain faujasite type zeolite having crystallinity ranging from 95 to 98%.

The present disclosure provides a process for the preparation of high crystallite size zeolite that involves usage of seed with zero maturation time.

Another embodiment of the invention provides a ready-to-use seed composition used for preparing a synthetic faujasite zeolite having thermal stability to a temperature of 950° C. and crystallinity ranging from 95 to 98% comprising
- a. water ($H_2O$),
- b. a source of silica ($SiO_2$),
- c. a source of alumina ($Al_2O_3$) and
- d. $Na_2O$, wherein the ratio of $H_2O:Na_2O$ ranges from 10 to 40, $Na_2O:SiO_2$ ranges from 1 to 2.5 and $SiO_2:Al_2O_3$ ranges from 1.5 to 5.

An embodiment of the present disclosure provides a process for producing a ready-to-use seed composition with zero maturation time for preparing a synthetic faujasite zeolite having thermal stability to a temperature of 950° C. and crystallinity ranging from 95 to 98%, comprising blending water ($H_2O$), a source of silica ($SiO_2$), a source of alumina ($Al_2O_3$) and $Na_2O$ to provide a seed composition having molar ratio of $H_2O:Na_2O$ ranging from 10 to 40, $Na_2O:SiO_2$ ranging from 1 to 2.5, and $SiO_2:Al_2O_3$ ranging from 1.5 to 5.

An embodiment of the present disclosure provides a process for preparing a synthetic faujasite zeolite having thermal stability to a temperature of 950° C. and crystallinity ranging from 95 to 98%, said process comprising,
- a) blending water ($H_2O$), a source of silica ($SiO_2$), a source of alumina ($Al_2O_3$) and $Na_2O$ to obtain a seed composition having molar ratio of $H_2O:Na_2O$ ranging from 10 to 40, $Na_2O:SiO_2$ ranging from 1 to 2.5 and $SiO_2:Al_2O_3$ ranging from 1.5 to 5;
- b) blending water ($H_2O$), a source of silica ($SiO_2$), a source of alumina ($Al_2O_3$) and $Na_2O$ to obtain a reaction gel composition having molar ratio of $H_2O:Na_2O$ ranging from 18 to 45, $Na_2O:SiO_2$ ranging from 0.4 to 0.9 and $SiO_2:Al_2O_3$ ranging from 7 to 20;
- c) homogeneously blending seed composition with reaction gel composition to form a seed-reaction gel composition; and
- d) heating the seed-reaction gel composition to a temperature ranging from 95 to 105° C. for a time period ranging from 18 to 30 hours to obtain the synthetic faujasite zeolite, wherein the synthetic faujasite zeolite having crystallite size ranging from 1950 to 2200 Å.

Further, the present disclosure provides a process for improving "crystallite size" thereby enhancing thermal stability of the faujasite zeolite.

The present disclosure provides a process for the preparation of a seed composition which can be instantly employed for the crystallization of faujasite type zeolite. The application of seed composition of the present disclosure to another gel reaction composition followed by heating of the seed gel mixture results in a crystalline synthetic faujasite having higher crystallite size, thermal stability and product being free of any extraneous impurities. The higher thermal stability has been attributed to the higher crystallite (grain) size, which is over 2000 Å. Crystallite size was measured employing well known Scherrer method in which, crystallite size "L" of a crystal is related to half peak height width "B" in a X-ray powder diffraction pattern through a relation:

$$L = K\lambda/B \cos \phi$$

where, K is Scherrer constant, $\lambda$ is wave length of X-ray and $\phi$ is angle of peak.

The present disclosure provides a process for the crystallization of high crystallite size synthetic faujasite that involves preparation of a seeding composition which can be instantaneously employed as a mature seed to enhance step crystallization of the faujasite zeolite.

The present disclosure provides a seed and gel composition prepared by sourcing silica from a group consisting of alkaline grade sodium silicate, neutral grade sodium silicate, colloidal silica, silica gel, and precipitated silica. Aluminum can be sourced from a group consisting of aluminum sulfate, sodium aluminate, aluminum acetate, aluminum formate, bayrite, pseudoboehmite, alumina gel and alumina sol.

The present disclosure provides a seed composition that requires no maturation time, wherein the seed composition is prepared by heating a source of silica to a temperature between 20 to 80° C. and adding a source of alumina maintained in the temperature range 30 to 100° C., to this hot solution with constant stirring. The above chemicals need to be mixed into a single seed composition with mixing time in the range of 10 minutes to 2 hours. The high crystallite size faujasite type zeolite is prepared by mixing 0.5 to 20 wt % of seed composition into another gel reaction composition, having controlled soda and water content followed by subjecting the seed gel mixture to a step of crystallization for a duration of 18 to 30 hours.

The present disclosure provides working examples which are given by way of illustration and should not be construed to limit the scope of the disclosure.

EXAMPLES

Example 1

Preparation of Seed Composition with a Molar Composition of $5.46Na_2O:1Al_2O_3:4SiO_2:109.69H_2O$ 99 gm of sodium silicate (16.0% $Na_2O$, 34.60% $SiO_2$, 49.4% $H_2O$) was diluted with 150 gm of demineralised (DM) water and heated to 80° C. To this, 130 gm solution of sodium aluminate (25% $Na_2O$, 11.2% $Al_2O_3$, 63.8% $H_2O$) maintained at a temperature of 80° C., was added drop wise with stirring in 30 minutes, to obtain a mature seed solution with a composition expressed in moles as; $5.46Na_2O:1Al_2O_3:4SiO_2:109.69H_2O$. The mature seed composition acts as an instant nucleation center. The instant use seed was dispersed in cold water, solids recovered by filtration, dried and characterized as X-ray amorphous.

Example 2

Preparation of Seed Composition with a Molar Composition of $4.85Na_2O:1Al_2O_3:2.63SiO_2:68.59H_2O$ 85 gm of sodium silicate (16.0% $Na_2O$, 34.60% $SiO_2$, 49.4% $H_2O$) was diluted with 85 gm of demineralised (DM) water and heated to 80° C. To this, 170 gm solution of sodium aluminate (25% $Na_2O$, 11.2% $Al_2O_3$, 63.8% $H_2O$) maintained at temperature 80° C., was added drop wise with stirring in 30 minutes to obtain mature seed solution with a composition expressed in moles as $4.85Na_2O:1Al_2O_3:2.63SiO_2:68.59H_2O$. The mature seed composition acts as an instant nucleation center. The instant use seed was dispersed in cold water, solids recovered by filtration, dried and characterized as X-ray amorphous.

Example 3

Preparation of Seed Composition with a Molar Composition of $4.49Na_2O:1Al_2O_3:1.82SiO_2:57.47H_2O$ 85 gm of sodium silicate (16.0% $Na_2O$, 34.60% $SiO_2$, 49.4% $H_2O$) was diluted with 80 gm of demineralised (DM) water and heated to 80° C. To this, 245 gm solution of sodium aluminate (25% $Na_2O$, 11.2% $Al_2O_3$, 63.8% $H_2O$) maintained at temperature 80° C., was added drop wise with stirring in 30 minutes, to obtain mature seed solution with a composition expressed in moles as; $4.49Na_2O:1Al_2O_3:1.82SiO_2:57.47H_2O$. The mature seed composition acts as an instant nucleation center. The instant use seed was dispersed in cold water, solids recovered by filtration, dried and characterized as X-ray amorphous.

Example 4

Preparation of High Crystallite Size Faujasite Type Zeolite 1143 gm of sodium silicate (16.0% $Na_2O$, 34.60% $SiO_2$, 49.1% $H_2O$) was diluted with 288 gm of DM water. To this, sodium hydroxide solution prepared by dissolving 81 gm sodium hydroxide pellets (77.5% $Na_2O$, 22.5% $H_2O$) in 252 gm of DM water was added under stirring. A solution containing 399 gm hydrated aluminum sulfate [$Al_2(SO_4)_3$, $16H_2O$ (16.17% $Al_2O_3$)] dissolved in 792 gm of DM water was added drop wise to the sodium silicate-alkali solution with constant stirring to obtain a thick gel. The thick gel was divided into three equal parts and each part was added with 2 wt %, 4 wt % and 6 wt % of seed (Prepared as per example 1), weight based on volatile free basis of batch size and stirred for five minutes. Batches containing 2 wt %, 4 wt % and 6 wt % of seed were respectively designated as 2(a), 2(b) and 2(c). Seed-reaction gel composition was held at 100±2° C., for 24 hours in a boiling water bath, while contents were stirred once in three hours. Crystallized products were filtered out. The zeolite cake was washed with boiling DM water till the pH of the filtrate came down to 9, and then dried at 110° C. for 16 hours to obtain dry products having 12 wt % moisture. The oven dried products were characterized for surface area, X-ray crystallinity with unit cell size, crystallite size and thermal stability. The physico-chemical properties of synthetic faujasite zeolites prepared employing instant seed composition are given in Table 1:

TABLE 1

| Batch No. | Surface area, $m^2/g$ | X-ray crystallinity, % | Unit cell size, Å | Crystallite size, Å | Crystallinity break down temperature, ° C. |
|---|---|---|---|---|---|
| Batch 2(a) | 675 | 90 | 24.66 | 2000 | 927 |
| Batch 2(b) | 690 | 92 | 24.67 | 1950 | 920 |
| Batch 2(c) | 700 | 94 | 24.66 | 1925 | 915 |

Example 5

Preparation of High Crystallite Size Faujasite Type Zeolite with Reaction Gel Composition Having a Molar Composition of $6.26Na_2O:1Al_2O_3:10.42SiO_2:3.00SO_4:137.76H_2O$ 381 gm of sodium silicate (16.0% $Na_2O$, 34.60% $SiO_2$, 49.1% $H_2O$) was diluted with 96 gm of DM water. To this, sodium hydroxide solution prepared by dissolving 27 gm sodium hydroxide pellets (77.5% $Na_2O$, 22.5% $H_2O$) in 50 gm of DM water was added under stirring. A solution containing 133 gm hydrated aluminum sulfate [$Al_2(SO_4)_3$, $16H_2O$ (16.17% $Al_2O_3$)] dissolved in 133 gm of DM water was added drop wise to the sodium silicate-alkali solution with constant stirring to obtain a thick gel. To the thick gel 48 gm of freshly prepared seed as per example 1 of present invention was added under stirring. Seed-reaction gel composition was held at 100±2° C., for 23 hours in a boiling water bath, while contents were stirred once in three hours. Crystallized product was filtered out. The zeolite cake was washed with boiling DM water till the pH of the filtrate came down to 9, and then dried at 110° C. for 16 hours to obtain a dry products having 12 wt % moisture. Thus oven-dried product was characterized by different techniques. Surface area of the product was measured as 680 m²/gm; crystallinity was measured as 92% with unit cell 24.67 Å. Crystallite size was measured as 2030 Å. DTA analysis of sample showed crystallinity loss at 925° C.

Example 6

Preparation of High Crystallite Size Faujasite Type Zeolite with Reaction Gel Composition Having a Molar Composition of 5.55Na₂O:1Al₂O₃:10.42SiO₂:3.0SO₄:132.49H₂O 381 gm of sodium silicate (16.0% Na₂O, 34.60% SiO₂, 49.1% H₂O) was diluted with 96 gm of DM water. To this, sodium hydroxide solution prepared by dissolving 15 gm sodium hydroxide pellets (77.5% Na₂O, 22.5% H₂O) in 30 gm of DM water was added under stirring. A solution containing 133 gm hydrated aluminum sulfate [Al₂(SO₄)₃, 16H₂O (16.17% Al₂O₃)] dissolved in 133 gm of DM water was added drop wise to the sodium silicate-alkali solution with constant stirring to obtain a thick gel. To the thick gel 48 gm of freshly prepared seed as per example of present invention was added under stirring. Seed-reaction gel composition was subjected to crystallization with conditions similar to that under example 3 and synthetic product was characterized. Surface area of the product was measured as 685 m²/gm; crystallinity was measured as 92% with unit cell 24.66°A. Crystallite size was measured as 2050 Å. DTA analysis of sample showed crystallinity loss at 935° C.

Reference Example 7

Preparation of Faujasite Type Zeolite Employing Seed Prepared as Per U.S. Pat. No. 6,284,218 with and without Maturation Time High crystallite size faujasite type zeolite was prepared by adding 4 wt % seed composition prepared as per U.S. Pat. No. 6,284,218 to the thick gel of example 4 of present application. Crystallized product was designated as 5(a). Another product designated as 5(b) was prepared by employing seed prepared as per U.S. Pat. No. 6,284,218 without aging (aging time zero hours). A third product designated as 5(c) was prepared with a procedure exactly similar to that explained under example 2 of U.S. Pat. No. 6,284,218. The characterization results of the products are shown in Table 2:

TABLE 2

| Batch No | Surface area, m²/g | X-ray crystallinity, % | Unit cell size, Å | Crystallite size, Å | Crystallinity break down temperature, ° C. |
|---|---|---|---|---|---|
| Batch 5(a) | 690 | 90 | 24.67 | 2000 | 900 |
| Batch 5(b) | 40 | NIL | NA | NA | NA |
| Batch 5(c) | 700 | 91 | 24.67 | 1790 | 875 |

From the results of characterization, it can be concluded that seed prepared as per U.S. Pat. No. 6,284,218 needs maturing time without which seed cannot promote crystallization of faujasite type crystalline phase. Further, faujasite type zeolite prepared as per referred example has lower crystallite size 1790 Å, thermal stability of 875° C., in comparison to stability between 905-940° C., for a zeolite prepared as per process of present invention.

What is claimed is:

1. A ready-to-use seed composition for preparing a synthetic faujasite zeolite, said zeolite having enhanced thermal stability and high crystallinity, said composition comprising
    a) water (H₂O),
    b) a source of silica (SiO₂),
    c) a source of alumina (Al₂O₃), and
    d) Na₂O,
wherein molar ratio of H₂O:Na₂O ranges from 5 to 20, Na₂O:SiO₂ ranges from 0.4 to 5 and SiO₂:Al₂O₃ ranges from 1.3 to 5.

2. The ready-to-use seed composition of claim 1, wherein molar ratio of H₂O:Na₂O ranges from 5 to 20, Na₂O:SiO₂ ranges from 1 to 2.5, and SiO₂:Al₂O₃ ranges from 1.5 to 5.

3. The ready-to-use seed composition of claim 1, wherein the source of silica is selected from a group consisting of alkaline sodium silicate, neutral grade sodium silicate, colloidal silica, silica gel, and precipitated silica.

4. The ready-to-use seed composition of claim 1, wherein the source of aluminum is selected from a group consisting of aluminum sulfate, sodium aluminate, aluminum acetate, aluminum formate, bayrite, pseudoboehmite, alumina gel and alumina sol.

5. A process for producing ready-to-use seed composition, said process comprising blending water (H₂O), a source of silica (SiO₂), a source of alumina (Al₂O₃) and Na₂O to provide a seed composition having molar ratio of H₂O:Na₂O ranges from 5 to 20, Na₂O:SiO₂ ranges from 0.4 to 5 and SiO₂:Al₂O₃ ranges from 1.3 to 5.

6. The process of claim 5, wherein the source of silica is dissolved in water and heated to a temperature ranging from 20 to 80° C. before blending.

7. The process of claim 5, wherein the source of alumina (Al₂O₃) is heated to a temperature ranging from 30 to 100° C. before blending.

8. A process for preparing a synthetic faujasite zeolite with enhanced thermal stability and higher crystallite size, said process comprising;
    a) blending water (H₂O), a source of silica (SiO₂), a source of alumina (Al₂O₃) and Na₂O, to obtain a ready-to-use seed composition, having molar ratio of H₂O:Na₂O ranges from 5 to 20, Na₂O:SiO₂ ranges from 0.4 to 5 and SiO₂:Al₂O₃ ranges from 1.3 to 5, wherein the seed composition requires no maturation time;
    b) blending water (H₂O), a source of silica (SiO₂), a source of alumina (Al₂O₃) and Na₂O, wherein molar ratio of H₂O:Na₂O ranges from 8 to 1000, Na₂O:SiO₂ ranges from 0.1 to 2.0 and SiO₂:Al₂O₃ ranges from 5 to 20 to obtain a reaction gel composition;
    c) homogeneously blending seed composition with reaction gel composition to form a seed-reaction gel composition; and
    d) heating the seed-reaction gel composition to a temperature ranging from 95 to 105° C. for a time period ranging from 18-30 hours to obtain the synthetic faujasite zeolite, wherein the synthetic faujasite zeolite having crystallite size ranging from 1950-2200 Å.

9. The process of claim 8, wherein in step a) molar ratio of $H_2O:Na_2O$ ranges from 10 to 20, $Na_2O:SiO_2$ ranges from 1 to 2.5, and $SiO_2:Al_2O_3$ ranges from 1.5 to 5.

10. The process of claim 8, wherein in step b) molar ratio of $H_2O:Na_2O$ ranges from 18 to 45, $Na_2O:SiO_2$ ranges from 0.4 to 0.9, and $SiO_2:Al_2O_3$ ranges from 7 to 20.

11. The process of claim 8, wherein the ratio of the seed composition and the reaction gel composition ranges from 0.5 to 20:99.5 to 80 w/w.

12. The process as claimed in claim 8, wherein the synthetic faujasite zeolite has thermal stability to a temperature of 950° C.

13. The process of claim 8, wherein the synthetic faujasite zeolite has crystallinity ranging from 95 to 98%.

\* \* \* \* \*